United States Patent
Fukawa (10) Patent No.: US 9,858,488 B2
(45) Date of Patent: Jan. 2, 2018

(54) IMAGE PROCESSING DEVICE, METHOD THEREOF, AND MOVING BODY ANTI-COLLISION DEVICE

(75) Inventor: Yasurou Fukawa, Hiratsuka (JP)

(73) Assignee: Any Co. Ltd., Hiratsuka-shi (JP)

( * ) Notice: Subject to any disclaimer, the term of this patent is extended or adjusted under 35 U.S.C. 154(b) by 1098 days.

(21) Appl. No.: 13/422,803

(22) Filed: Mar. 16, 2012

(65) Prior Publication Data

US 2012/0236122 A1  Sep. 20, 2012

(30) Foreign Application Priority Data

Mar. 18, 2011  (CN) .......................... 2011 1 0065887

(51) Int. Cl.
*H04N 5/232* (2006.01)
*G06K 9/00* (2006.01)
*G08G 1/16* (2006.01)
*H04N 5/235* (2006.01)

(52) U.S. Cl.
CPC ......... *G06K 9/00805* (2013.01); *G08G 1/165* (2013.01); *G08G 1/166* (2013.01); *H04N 5/2356* (2013.01); *H04N 5/23212* (2013.01); *B60R 2300/8093* (2013.01)

(58) Field of Classification Search
CPC ........ B60R 2300/8093; G06K 9/00805; G08G 1/166; H04N 5/23212; H04N 5/2356
See application file for complete search history.

(56) References Cited

U.S. PATENT DOCUMENTS

| 2003/0007074 A1* | 1/2003 | Nagaoka et al. ............. 348/148 |
| 2003/0151679 A1* | 8/2003 | Amerson et al. .......... 348/231.6 |
| 2004/0036795 A1* | 2/2004 | Fujii et al. ..................... 348/349 |

(Continued)

FOREIGN PATENT DOCUMENTS

| CN | 101311672 A | 11/2008 |
| CN | 101458078   | 6/2009  |

(Continued)

OTHER PUBLICATIONS

Chinese Office Action for Application No. 201110065887.9 dated Jan. 2, 2014.

(Continued)

*Primary Examiner* — Md Haque
(74) *Attorney, Agent, or Firm* — Patterson & Sheridan, LLP (57) ABSTRACT

An image processing device is disclosed that is able to accurately recognize objects at a close distance. The image processing device includes a camera unit, and an image processing unit. The camera unit includes a lens, a focusing unit and an image pick-up unit. The focusing unit drives the lens to sequentially change the focusing distance of the camera unit to perform a focus-sweep operation, so that clear images of objects at different positions in an optical axis of the lens are sequentially formed on the image pick-up unit. The image processing unit receives the plurality of images obtained by the image pick-up unit in the focus-sweep operation, identifies objects with clear images formed in the plurality of images, and produces an object distribution view according to the focusing distances used when picking up the plurality of image to show a position distribution of the identified objects.

6 Claims, 10 Drawing Sheets

(56) References Cited

U.S. PATENT DOCUMENTS

| | | | |
|---|---|---|---|
| 2007/0002461 A1* | 1/2007 | Iwasawa | 359/687 |
| 2007/0035628 A1* | 2/2007 | Kanai | 348/159 |
| 2009/0024357 A1* | 1/2009 | Aso et al. | 702/181 |
| 2009/0160999 A1* | 6/2009 | Nishimura | 348/345 |
| 2009/0226054 A1* | 9/2009 | Jelinek | 382/126 |
| 2009/0237269 A1* | 9/2009 | Okugi et al. | 340/901 |
| 2010/0134631 A1* | 6/2010 | Voth et al. | 348/169 |
| 2010/0259631 A1* | 10/2010 | Sugita | 348/222.1 |
| 2011/0019873 A1* | 1/2011 | Yamato | 382/103 |

FOREIGN PATENT DOCUMENTS

| | | |
|---|---|---|
| EP | 1956457 A1 | 8/2008 |
| JP | 5-143158 | 6/1993 |
| JP | 1998-143245 | 5/1998 |
| JP | 10-213449 | 8/1998 |
| JP | 11-120499 | 4/1999 |
| JP | 2000-304856 | 11/2000 |
| JP | 2001-337724 | 12/2001 |
| JP | 2004-348645 A | 12/2004 |
| JP | 2007-192730 A | 8/2007 |
| JP | 2008-028951 A | 2/2008 |
| JP | 2010-66156 A | 3/2010 |
| JP | 2010-191793 A | 9/2010 |

OTHER PUBLICATIONS

Chinese Office Action for Application No. 201110065887.9, dated Dec. 7, 2012, with English translation.
Japanese Office Action, Application No. 2012-60124, dated Jul. 2, 2013.
Notification of Reexamination dated Jan. 29, 2015 for Application No. CN201110065887.9.
Notification of Reexamination dated Apr. 14, 2015 for Application No. CN201110065887.9.

* cited by examiner

IMAGE PROCESSING DEVICE, METHOD THEREOF, AND MOVING BODY ANTI-COLLISION DEVICE

BACKGROUND OF THE INVENTION

1. Field of the Invention

The present invention relates to an image processing device, a method thereof, and a moving body anti-collision device using the image processing device.

2. Description of the Related Art

Japanese Laid-Open Patent Application No. 2000-304856 (hereinafter, referred to as "reference 1") and Japanese Laid-Open Patent Application No. 11-120499 (hereinafter, referred to as "reference 2") disclose an anti-collision device which is mounted on an aircraft or a ship, and utilizes GPS (Global Positioning System) or a radar.

Japanese Patent Gazette No. 3260645 (hereinafter, referred to as "reference 3") discloses a navigation device of ground transportation means, such as a vehicle, by using GPS technique.

Japanese Laid-Open Patent Application No. 2001-337724 (hereinafter, referred to as "reference 4") discloses a technique of preventing an unmanned vehicle from entering a certain area by using GPS.

Japanese Laid-Open Patent Application No. 5-143158 (hereinafter, referred to as "reference 5") discloses a technique of preventing collisions between unmanned vehicles by using wireless monitoring apparatuses.

In recent years, the following technique was proposed, in which a moving body anti-collision device includes a GPS receiver, a speed detector and a direction detector, the moving body anti-collision device obtains GPS position information, speed information and direction information through the above components and transmits the information to other moving bodies, and other moving bodies that received the above information are able to determine whether collisions occur.

In the prior art which utilizes GPS, a large error may be involved when determining the distance between moving bodies because of an inherent accuracy of GPS positioning and precision of GPS receivers. Usually, the error is in the range from several meters to over ten meters. As a result, in a small area where moving bodies are close to each other and a collision may occur, positions of moving bodies cannot be correctly detected.

SUMMARY OF THE INVENTION

An embodiment of the present invention may solve one or more problems of the related art.

A preferred embodiment of the present invention may provide an image processing device, a method thereof, and a moving body anti-collision device using the image processing device able to accurately recognize objects at a close distance.

According to a first aspect of the present invention, there is provided an image processing device, comprising:

a camera unit, and an image processing unit that processes images provided by the camera unit, wherein the camera unit includes:

a lens, a focusing unit that drives the lens to change a focusing distance of the camera unit, and an image pick-up unit, wherein the focusing unit drives the lens to sequentially change the focusing distance of the camera unit to perform a focus-sweep operation, so that clear images of objects at different positions in an optical axis of the lens are sequentially formed on the image pick-up unit, the image pick-up unit sequentially picks up a plurality of images corresponding to different focusing distances in the focus-sweep operation, and the image processing unit receives the plurality of images obtained by the image pick-up unit of the camera unit in the focus-sweep operation, identifies objects with clear images formed in the plurality of images, and produces an object distribution view according to the focusing distances used when picking up the plurality of images, said object distribution view indicating a position distribution of the identified objects.

According to the present embodiment, the image processing device produces object distribution views of objects shot by the camera unit. The object distribution view can be used in various situations, such as position identification and monitoring of apparatuses in factories, visual angle switching in sports broadcasting, interactive entertainment, and moving body anti-collision device of the present invention as described below.

As an embodiment, a difference between the focusing distances of two adjacent images sequentially captured by the camera unit in the focus-sweep operation is less than or equal to one meter.

According to the present embodiment, it is possible to enhance accuracy of forming images of objects.

As an embodiment, the camera unit picks up images at a speed greater than or equal to 500 frames per second.

According to the present embodiment, it is possible to improve the real-time performance, decrease the difference between the focusing distances of two adjacent images sequentially captured by the camera unit in the focus-sweep operation, and thus shorten the time period of the focus-sweep.

As an embodiment, the camera unit repeatedly performs a plurality of the focus-sweep operations, and the image processing unit produces a plurality of the object distribution views corresponding to the plurality of the focus-sweep operations.

According to the present embodiment, because the focus-sweep operation is repeatedly performed, it is possible to update the images anytime, hence, improve the real-time performance.

As an embodiment, the camera unit performs five or more focus-sweep operations per second.

According to the present embodiment, it is possible to improve the real-time performance.

As an embodiment, the image pick-up unit includes one or more of a CCD sensor and a CMOS sensor. Furthermore, the image pick-up unit may include an infrared image pick-up unit.

As an embodiment, the lens includes a zooming lens, and the camera unit includes a zooming unit that drives the lens to change a focal length thereof, when the focusing distance is greater than a predetermined value, the zooming unit drives the lens to increase the focal length, when the focusing distance is less than a predetermined value, the zooming unit drives the lens to decrease the focal length.

According to a second aspect of the present invention, there is provided a method of an image processing device including a camera unit and an image processing unit that processes images provided by the camera unit, wherein the camera unit includes a lens, a focusing unit that drives the lens to change a focusing distance, and an image pick-up unit.

The method comprising the steps of:

driving the lens to sequentially change the focusing distance of the camera unit to perform a focus-sweep operation so as to form, in the image pick-up unit, clear images of objects at different positions in an optical axis of the lens, wherein the image pick-up unit picks up a plurality of images corresponding to the different focusing distances in the focus-sweep operation, receiving the plurality of images obtained by the image pick-up unit of the camera unit in the focus-sweep operation, and identifying objects with clear images formed in the plurality of images obtained by the image pick-up unit of the camera unit in the focus-sweep operation, and producing an object distribution view according to the focusing distances used when picking up the plurality of images, said object distribution view indicating a position distribution of the identified objects.

As an embodiment, the method further comprises the steps of:

repeatedly performing a plurality of the focus-sweep operations, and producing a plurality of the object distribution views corresponding to the plurality of the focus-sweep operations.

According to a third aspect of the present invention, there is provided a moving body anti-collision device provided on a moving body, comprising;

a camera unit that picks up images around the moving body, an image processing unit that processes images provided by the camera unit, and a collision determination unit, wherein the camera unit includes:

a lens, a focusing unit that drives the lens to change a focusing distance, and an image pick-up unit, wherein the focusing unit drives the lens to sequentially change the focusing distance of the camera unit to perform a focus-sweep operation, so that clear images of objects at different distances from the moving body in an optical axis of the lens are sequentially formed on the image pick-up unit, the image pick-up unit picks up a plurality of images corresponding to different focusing distances in the focus-sweep operation, the image processing unit receives the plurality of images obtained by the image pick-up unit of the camera unit in the focus-sweep operation, identifies objects with clear images formed in the plurality of images, and produces an object distribution view according to the focusing distances used when picking up the plurality of images, said object distribution view indicating relative positions between the identified objects and the moving body, and the collision determination unit determines whether the moving body is to collide with the identified body according to the object distribution view.

According to the present embodiment, it is possible to effectively prevent collisions of moving bodies according to the object distribution view.

As an embodiment, the moving body anti-collision device further comprises:

a display unit that displays the object distribution view, wherein the display unit displays the identified object with a different color when the collision determination unit determines the moving body is to collide with the identified body.

In addition, the moving body anti-collision device may comprise:

a notification unit that notifies an operator of the moving body, wherein the notification unit transmits a warning message to the operator when the collision determination unit determines the moving body is to collide with the identified body. The notification unit may include at least one of a speaker and a vibrator.

In addition, the moving body anti-collision device may further comprises a display unit that displays the object distribution view, wherein the image processing unit adds grid lines in the object distribution view to indicate distance intervals, According to the above embodiments, when the collision determination unit determines the moving body is to collide with the identified body, the display unit or the notification unit notifies an operator of the moving body or a driver of the vehicle to take measures to avoid the collision.

As an embodiment, the moving body anti-collision device may further comprise:

a control unit that controls movement of the moving body, wherein when the collision determining unit determines the moving body is to collide with the identified body, the control unit brakes or accelerates the moving body, or changes direction of the moving body.

According to the present embodiment, with the control unit, it is possible to control the moving body to avoid collisions, and to realize automatic driving.

As an embodiment, the moving body anti-collision device further comprises:

a speed sensor that detects a speed of the moving body, wherein the collision determination unit determines, whether the moving body is to collide with the identified body according to the speed of the moving body detected by the speed sensor.

According to the present embodiment, the collision determination unit is able to accurately determine whether the moving body is to collide with the identified body.

As an embodiment, the lens includes a zooming lens, and the camera unit includes a zooming unit that drives the lens to change a focal length thereof, when the focusing distance is greater than a predetermined value, the zooming unit drives the lens to increase the focal length, when the focusing distance is less than a predetermined value, the zooming unit drives the lens to decrease the focal length.

According to the embodiment, it is possible to increase position accuracy of objects in images, and enable identification of objects at far distances.

According to a fourth aspect of the present invention, there is provided a moving body anti-collision device provided on a moving body, comprising;

a camera unit that picks up images around the moving body, an image processing unit that processes images provided by the camera unit, and a display unit, wherein the camera unit includes:

a lens, a focusing unit that drives the lens to change a focusing distance, and an image pick-up unit, wherein the focusing unit drives the lens to sequentially change the focusing distance of the camera unit to perform a focus-sweep operation, so that clear images of objects at different distances from the moving body in an optical axis of the lens are sequentially formed on the image pick-up unit, the image pick-up unit picks up a plurality of images corresponding to the different focusing distances in the focus-sweep operation, the image processing unit receives the plurality of images obtained by the image pick-up unit of the camera unit in the focus-sweep operation, identifies objects with clear images formed in the plurality of images, and produces an object distribution view according to the focusing distances used when picking up the plurality of images, said object distribution view indicating relative positions between the identified objects and the moving body, and the display unit displays the object distribution view.

As an embodiment, the image processing unit produces the object distribution view in a three-dimension mode.

According to the above embodiments, an operator of the moving body or a driver of the vehicle is able to see objects around the moving body, and this improves safety.

DESCRIPTION OF THE PREFERRED EMBODIMENTS

Below, preferred embodiments of the present invention are described with reference to the accompanying drawings.

In the following embodiments, an image processing device of the present invention is applied to a moving body anti-collision device, and the moving body anti-collision device utilizes the images produced by the image processing device to determine whether the moving body, such as a vehicle, is to collide with other obstacles or objects.

Figure 1:
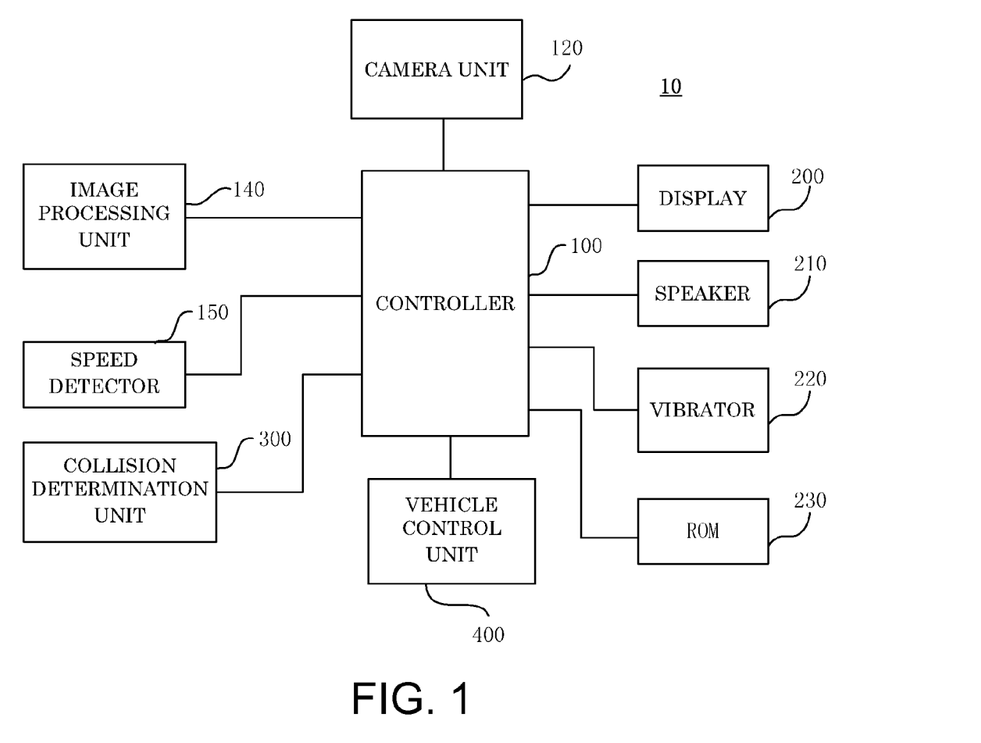
FIG. 1 is a block diagram illustrating a configuration of a moving body anti-collision device according to an embodiment of the present invention.

FIG. 1 is a block diagram illustrating a configuration of a moving body anti-collision device according to an embodiment of the present invention.

In the present embodiment, a moving body anti-collision device (hereinafter referred to as "anti-collision device") 10 is installed in a vehicle 20. By using the anti-collision device 10, it is possible to prevent collision accident of the vehicle 20.

As shown in FIG. 1, the anti-collision device 10 includes a camera unit 120, an image processing unit 140, a speed detector 150, a display 200, a speaker 210, a vibrator 220, a Read Only Memory (ROM) 230, a collision determination unit 300, a vehicle control unit 400 that controls movement of the vehicle 20, and a controller 100 that controls all components of the anti-collision device 10.

In the present embodiment, the camera unit 120 is provided at a front end of the vehicle 20 to shoot objects in front of the vehicle 20. The camera unit captures many images (denoted as "FRAME") in a focus-sweep operation as described below, and sends the images FRAME to the image processing unit 140 through the controller 100.

The image processing unit 140 receives the images FRAME provided by the camera unit 120, identifies clear images formed in the images FRAME, and further identifies objects corresponding to these clear images. Further, the image processing unit 140 generates a plain view (referred to as "object distribution view") indicating relative positions between the objects having clear images and the vehicle 20 according to the distances of the objects having clear images.

The camera unit 120 and the image processing unit 140 constitute an image processing device 30 of the present embodiment. As described above, the image processing device 30 shoots the objects in front of the vehicle 20, identifies objects in front of the vehicle 20, and generates the object distribution view indicating the relative positions of the objects relative to the vehicle 20.

The display 200 displays the object distribution view generated by the image processing unit 140 to show the driver of the vehicle 20 whether there are obstacles or other objects in front of the vehicle 20.

The collision determination unit 300 determines whether the vehicle 20 is to collide with the identified object according to the object distribution view generated by the image processing unit 140.

The speed detector 150 detects the speed of the vehicle 20. With the speed information detected by the speed detector 150, the collision determination unit 300 determines whether the vehicle 20 is to collide with obstacles or other objects.

When the collision determination unit 300 determines that collision is to occur, the speaker 210 gives a warning message, or the vibrator 220 vibrates to notify the driver of the vehicle 20 to take appropriate measures to avoid the collision.

When the collision determination unit 300 determines the vehicle 20 is to collide with an object, the vehicle control unit 400 controls to brake or accelerate the vehicle 20, or change the direction of the vehicle 20 to avoid the collision.

The controller 100 controls the above components of the anti-collision device 10.

Figure 2:
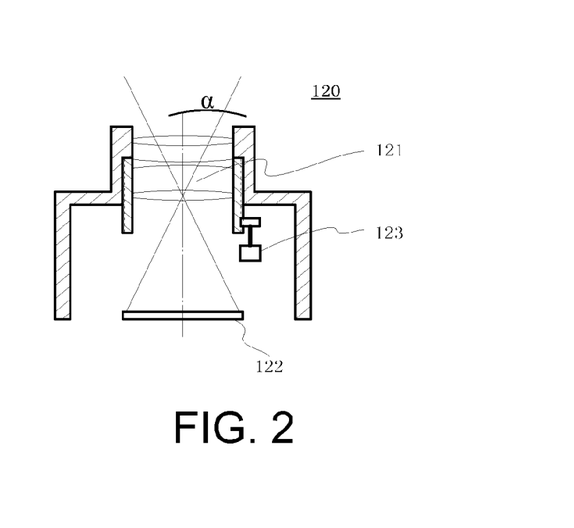
FIG. 2 is a diagram illustrating a configuration the camera unit 120.

FIG. 2 is a diagram illustrating a configuration of the camera unit 120.

As shown in FIG. 2, the camera unit 120 of the anti-collision device 10 includes a lens 121, a CCD sensor 122, and a driving motor 123. The lens 121 is composed of a set of lenses. An image of an object facing the lens 121 is formed on the CCD sensor 122 through the lens 121, and the CCD sensor 122 captures the image of the object. The driving motor 123 drives the lenses in the lens 121 to move along the optical axis, and consequently, clear images of the objects at different distance from the vehicle 20 are sequentially formed on the CCD sensor 122.

Figure 3:
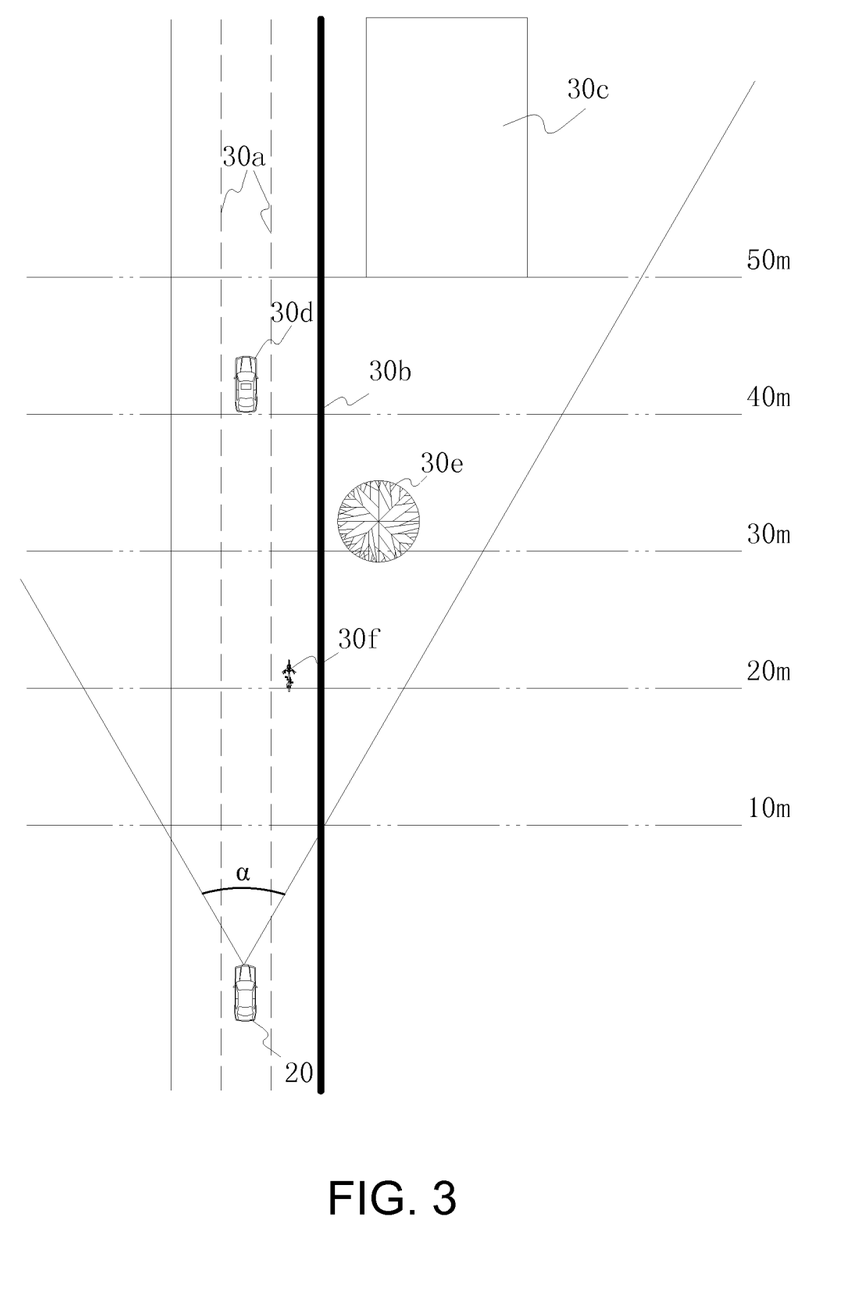
FIG. 3 is a diagram illustrating the scope of the camera unit 120.

FIG. 3 is a diagram illustrating the scope of the camera unit 120.

As shown in FIG. 3, in the present embodiment, the camera unit 120 of the anti-collision device 10, which is provided on the vehicle 20, shoots objects in front of the vehicle 20 with a certain shooting angle α. Through the lens 121, images of the objects within the shooting angle α are formed on the CCD sensor 122, but only those objects on a plane at a distance equal to the focusing distance of the camera unit 120 have clear images. Therefore, when the driving motor 123 continues driving the lens 121 to sequentially change the focusing distance of the camera unit 120, clear images of the objects within the shooting angle α are sequentially formed on the CCD sensor 122 from the far side to the near side (or from the near side to the far side). In this embodiment, the operation of sequentially increasing or decreasing the focusing distance of the camera unit 120, and sequentially forming clear images of the objects in front of the camera unit 120 on the CCD sensor 122 is referred to as "focus-sweep".

The driving motor 123 may be a stepping motor or piezoelectric element or others applicable to an optical lens. The controller 100 controls the rotation angle of the driving motor 123 according to a preset focusing distance, so that the objects in front of the vehicle 20 at the focusing distance have clear images on the CCD sensor 122.

When the driving motor 123 drives the lens 121 to perform the focus-sweep operation, the CCD sensor 122 captured a number of images. In the present embodiment, for example, as shown in FIG. 3, in one focus-sweep operation, the focusing distances of the camera unit 120 is sequentially set to be 50 meters, 40 meters, 30 meters, 20 meters, and 10 meters, and five images FRAME 1 to FRAME 5 are captured, respectively.

FIG. 4A to FIG. 4E are diagrams illustrating the images FRAME 1 to FRAME 5 captured by the camera unit 120 in the focus-sweep operation.

Figure 4A:
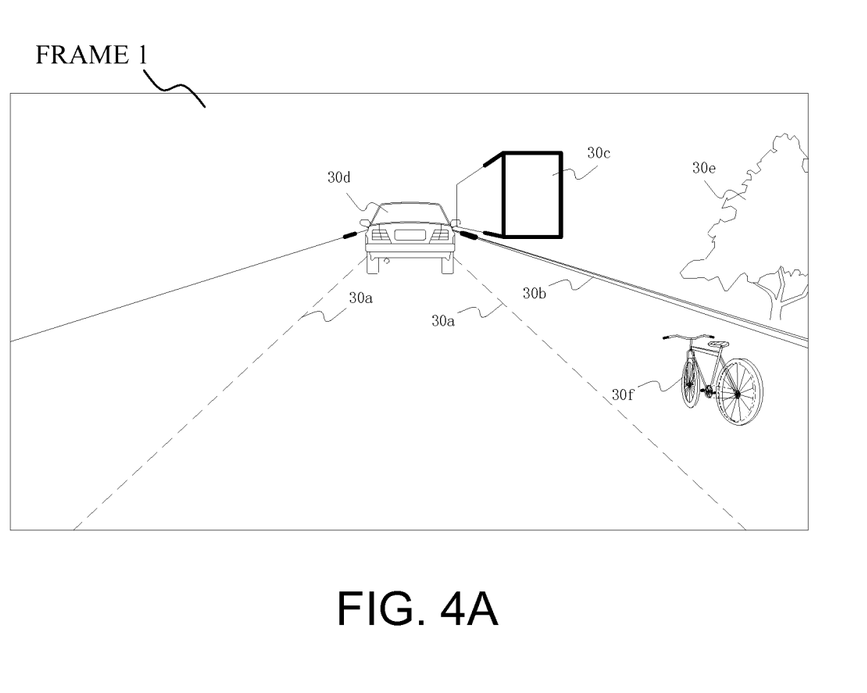
FIG. 4A to FIG. 4E are diagrams illustrating the plural images captured by the camera unit 120 in one focus-sweep operation.
Figure 4B:
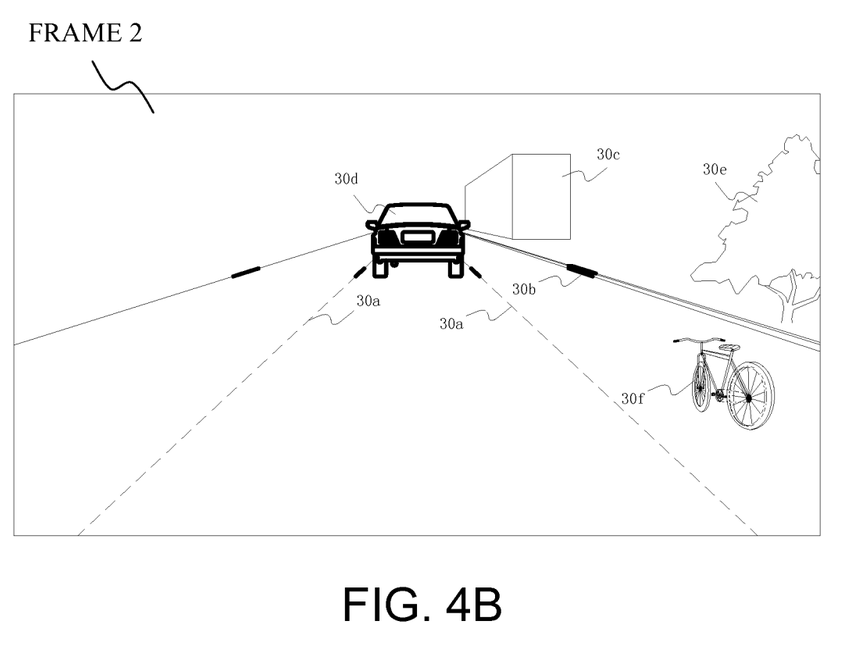
Figure 4C:
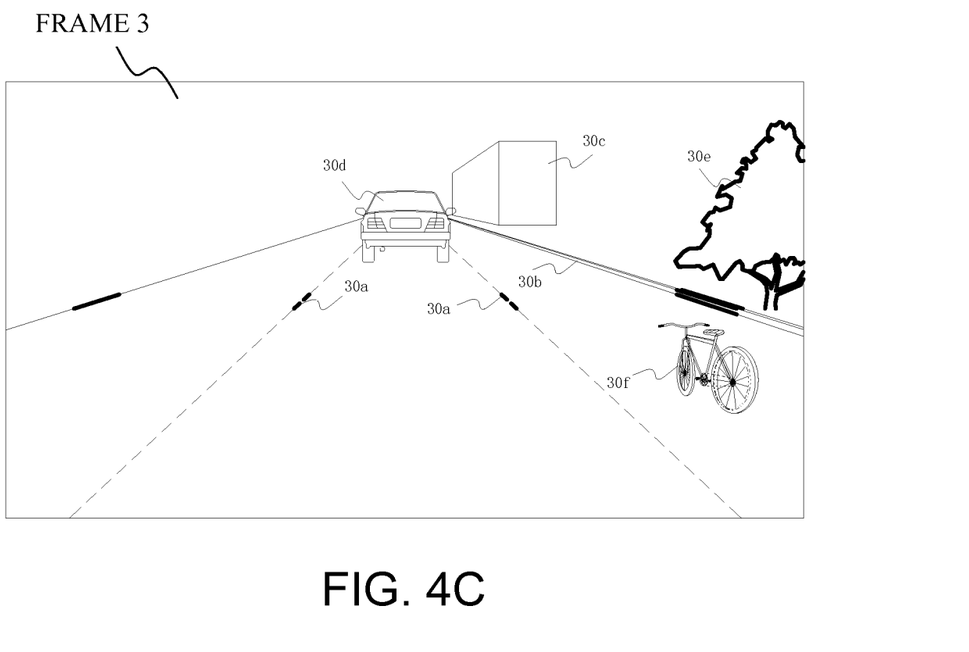
Figure 4D:
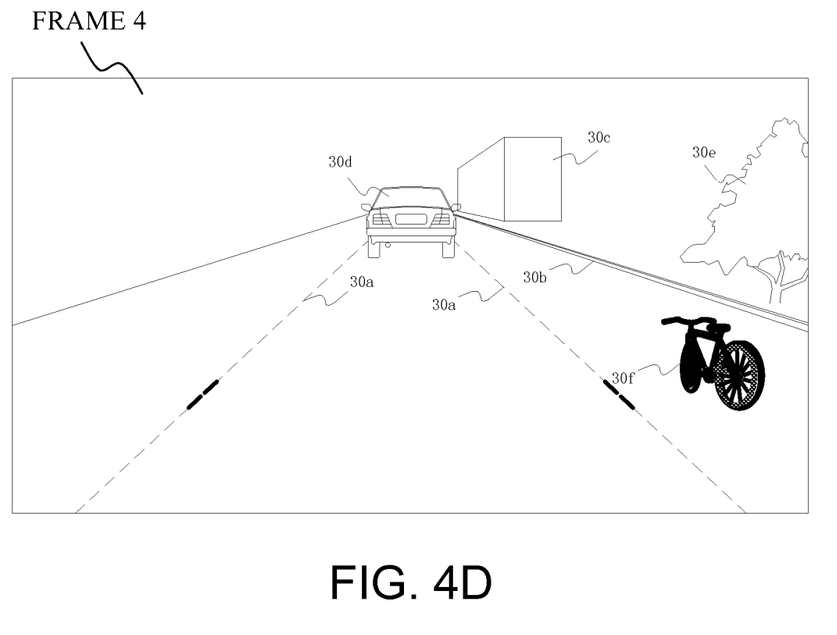
Figure 4E:
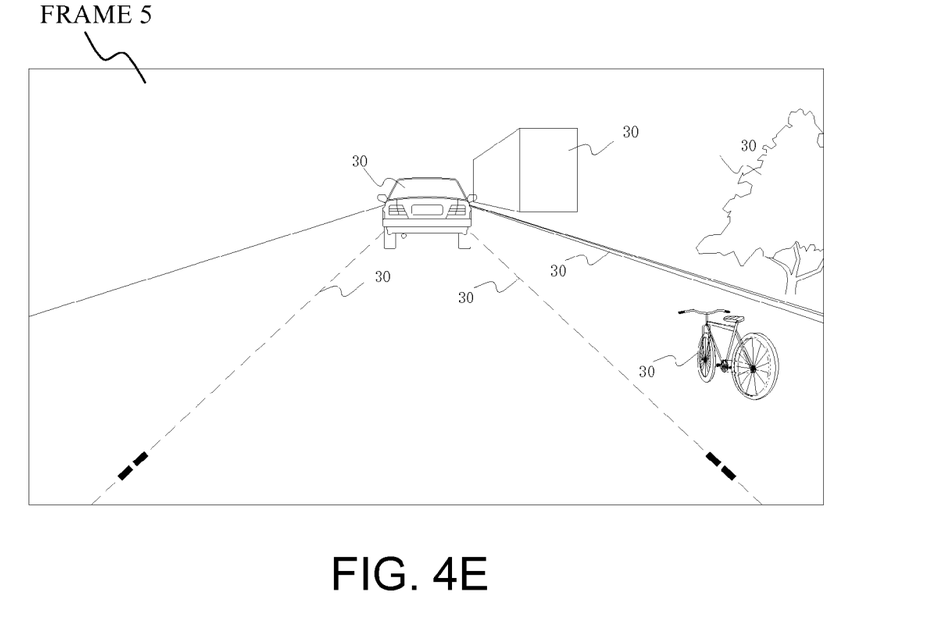

Here, FIG. 4A is a diagram illustrating the image FRAME 1 shot at a focusing distance of 50 m, FIG. 4B is a diagram illustrating the image FRAME 2 shot at a focusing distance of 40 m, FIG. 4C is a diagram illustrating the image FRAME 3 shot at a focusing distance of 30 m, FIG. 4D is a diagram illustrating the image FRAME 4 shot at a focusing distance of 20 m, and FIG. 4E is a diagram illustrating the image FRAME 5 shot at a focusing distance of 10 m.

In FIG. 4A to FIG. 4E, thick lines indicate images of the objects having clear images on the CCD sensor 122, and thin lines indicate images of the objects that do not have clear images.

In FIG. 4A, within the shooting angle α, the objects at a distance of 50 meters from the vehicle 20 have clear images on the CCD sensor 122. In this case, as shown in FIG. 4A, the objects having clear images include a road mark 30a, a road boundary 30b, and a building 30c beside the road at a distance of 50 meters from the vehicle 20. Therefore, the image FRAME 1 as shown in FIG. 4A is obtained which includes the above clear images (thick lines) and those unclear images (thin lines).

As shown in FIG. 4B, the driving motor 123 drives the lens 121, and the focusing distance is shortened. In this case, the objects at a distance of 40 meters from the vehicle 20 have clear images on the CCD sensor 122. The objects having clear images include the road mark 30a, the road boundary 30b, and a vehicle 30d at a distance of 40 meters from the vehicle 20. Thus, the image FRAME 2 as shown in FIG. 4B is obtained which includes the above clear images (thick lines) and those unclear images (thin lines).

As shown in FIG. 4C, the driving motor 123 further drives the lens 121 to further shorten the focusing distance. In this case, the objects at a distance of 30 meters from the vehicle 20 have clear images on the CCD sensor 122. The objects having clear images include the road mark 30a, the road boundary 30b, and trees 30e beside the road at a distance of 30 meters from the vehicle 20. Thus, the image FRAME 3 as shown in FIG. 4C is obtained which includes the above clear images (thick lines) and those unclear images (thin lines).

As shown in FIG. 4D, the driving motor 123 further drives the lens 121, and the focusing distance is further shortened. In this case, the objects at a distance of 20 meters from the vehicle 20 have clear images the CCD sensor 122. The objects having clear images include the road mark 30a, the road boundary 30b, and a bicycle 30f at a distance of 20 meters from the vehicle 20. Thus, the image FRAME 4 as shown in FIG. DA is obtained which includes the above clear images (thick lines) and those unclear images (thin lines).

As shown in FIG. 4E, the driving motor 123 further drives the lens 121, and the focusing distance is further shortened. In this case, the objects at a distance of 10 meters from the vehicle 20 have clear images. The objects having clear images include the road mark 30a, the road boundary 30b at a distance of 10 meters from the vehicle 20. Thus, the image FRAME 5 as shown in FIG. 4E is obtained which includes the above clear images (thick lines) and those unclear images (thin lines).

The images FRAME 1-5 taken by the camera unit 120 are input into the image processing unit 140 for image processing as described below.

Next, operations of the anti-collision device 10 are described in detail.

In the present embodiment, in the focus-sweep operation, it is assumed that the longest focusing distance is 50 meters, the shortest focusing distance is 10 meters, and in one focus-sweep operation, the focusing distances is adjusted sequentially in a descending order, that is, 50 meters, 40 meters, 30 meters, 20 meters, 10 meters, or in an ascending order, that is, 10 meters, 20 meters, 30 meters, 40 meters, 50 meters, and five images FRAME 1-FRAME 5 are formed respectively.

Figure 5:
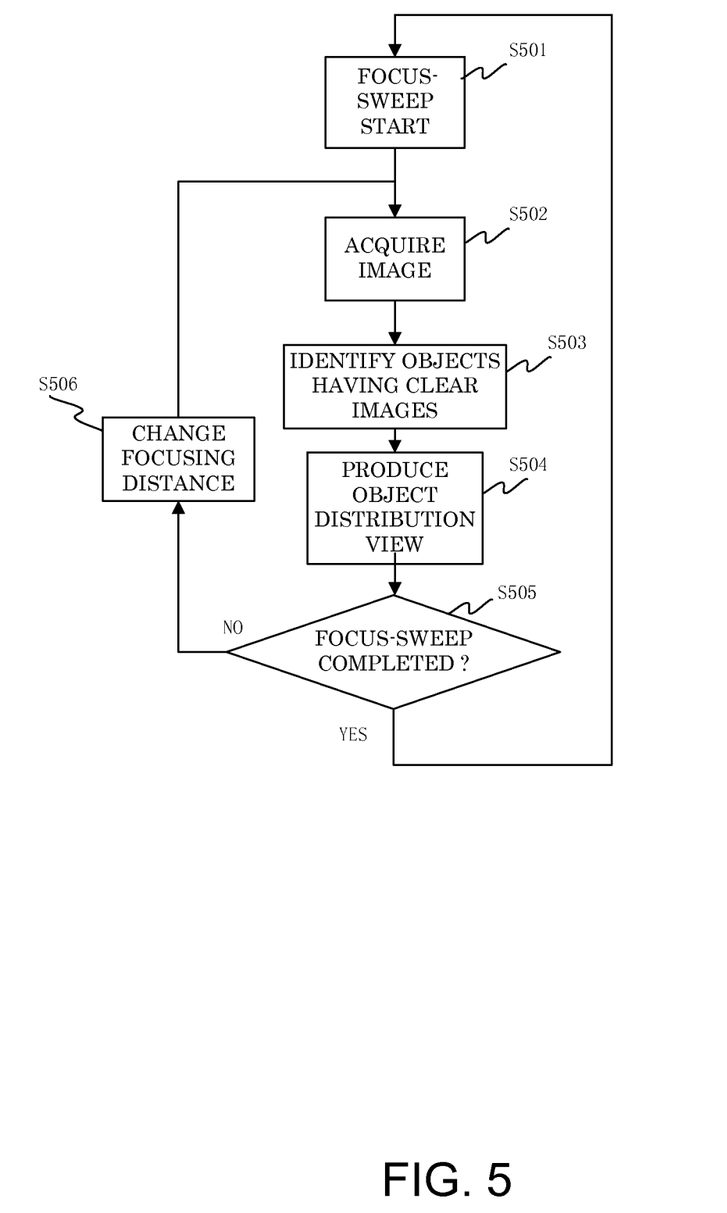
FIG. 5 is a flow chart illustrating operations of the anti-collision device 10.

FIG. 5 is a flow chart illustrating operations of the anti-collision device 10.

As shown in FIG. 5, in step S501, the focus-sweep starts. The driving motor 123 of the camera unit 120 drives the lens 121 so that clear images of the objects at a distance of 50 meters ahead are formed on the CCD sensor 122, that is, to adjust the focusing distance to be 50 meters.

In step S502, the CCD image sensor 122 obtains the image FRAME 1, and transmits the image FRAME 1 to the image processing unit 140.

In step S503, the image processing unit 140 identifies the objects with clear images formed in the image FRAME 1.

From the images FRAME 1, the image processing unit 140 identifies the road mark 30a, the road boundary 30b, and the building 30c at a distance of 50 meters from the vehicle 20. Although the vehicle 30d, the trees 30e, and the bicycle 30f are also in the image FRAME 1, these objects are not recognized by the image processing unit 140 because these objects do not have clear images in the image FRAME 1.

In step S504, the image processing unit 140 calculates positions of the road mark 30a, the road boundary 30b, and the building 30c based on the focusing distance used when capturing the images FRAME 1, and generates an object distribution view indicating the position distribution of these identified objects.

Figure 6:
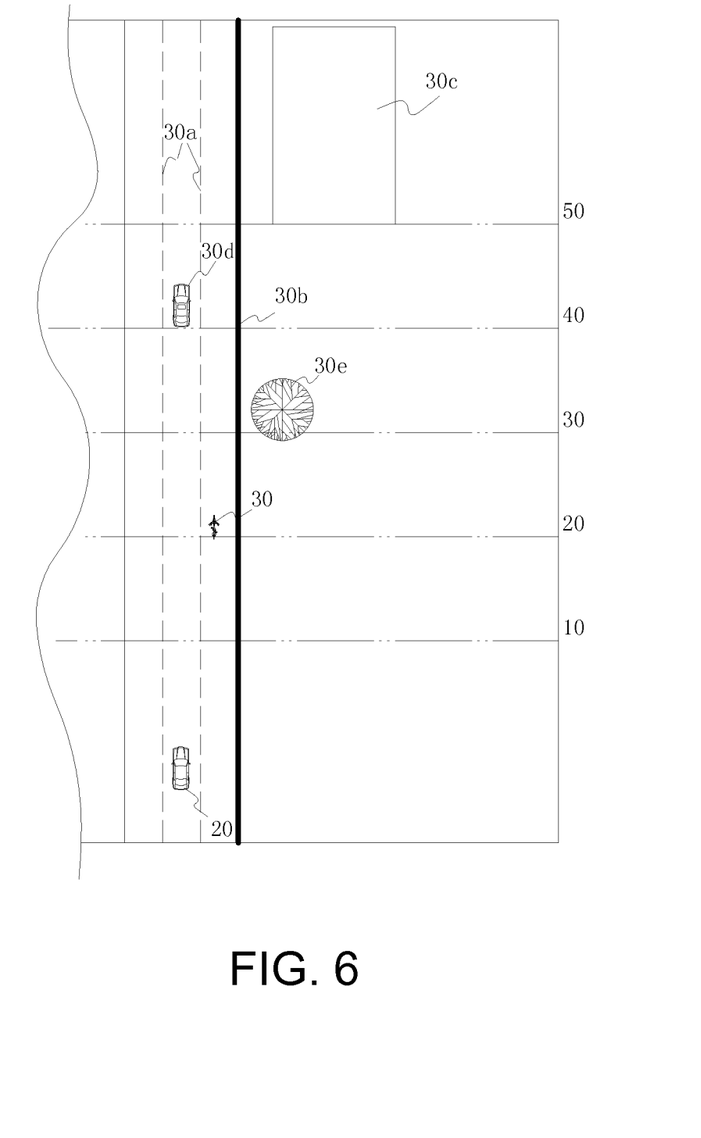
FIG. 6 illustrates the object distribution view generated by the image processing unit 140 which indicates the position distribution of the identified objects.

FIG. 6 illustrates the object distribution view generated by the image processing unit 140 which indicates the position distribution of the identified objects.

At this moment, the focusing distance is 50 meters, and only those objects 50 meters apart from the vehicle 20 have clear images in the image FRAME 1. The positions of these objects having clear images are determined by their angular positions when shooting the image FRAME 1. Therefore, the image processing unit 140 generates images of the road mark 30a, the road boundary 30b, and the building 30c at a dashed line 50 meters ahead of the vehicle 20 in the view shown in FIG. 6.

Then, in step S505, it is determined whether all of the images FRAME shot by the camera unit 120 in one focus-sweep operation have been processed. If some images FRAME have not been processed, proceeds to step S506.

In step S506, the drive motor 120 drives the lens 121 to change the focusing distance. For example, the focusing distance is shortened to be 40 meters, thus, clear images are formed on the CCD sensor 122 for the objects 40 meters ahead of the vehicle 20.

Then, repeat step S502. The camera unit 120 obtains the image FRAME 2 (see FIG. 4B) through the CCD sensor 122, and transmits the image FRAME 2 to the image processing unit 140.

Then, in step S503, similar to the above processing for the image FRAME 1, the image processing unit 140 identifies the objects having clear images in the image FRAME 2. These objects include the road mark 30a, the road boundary 30b, and the vehicle 30d at a distance of 40 meters ahead of the vehicle 20.

In step S504, based on the focusing distance when capturing the images FRAME 2 (40 meters), the image processing unit 140 generates images of the road mark 30a, the road boundary 30b, and the vehicle 30d, at a dot-dashed line which is 40 meters ahead of the vehicle 20 in the object distribution view shown in FIG. 6.

Next, in step S505, it is determined whether all of the images FRAME shot by the camera unit 120 in one focus-sweep operation have been processed. If some images FRAME have not been processed, proceeds to step S506.

Following the determination results, the images FRAME 3-5 are taken, and the same processing is performed. Below is a brief description of the processing for the images FRAME 3-5.

Regarding the image FRAME 3, the focusing distance is shortened to be 30 meters to capture the image FRAME 3. The image processing unit 140 identifies the road mark 30a, the road boundary 30b, and the trees 30e which are located at a distance of 30 meters from the vehicle 20 and thus have clear images in the image FRAME 3, and generates images of these objects at positions corresponding to the distance of 30 meters in the object distribution view shown in FIG. 6.

Regarding the image FRAME 4, the focusing distance is shortened to be 20 meters to capture the image FRAME 4. The image processing unit 140 identifies the road mark 30a, the road boundary 30b, and the bicycle 30f which are located at a distance of 20 meters from the vehicle 20 and thus have clear images in the image FRAME 4, and generates images of these objects at positions corresponding to the distance of 20 meters in the object distribution view shown in FIG. 6.

Regarding the image FRAME 5, the focusing distance is shortened to be 20 meters to capture the image FRAME 4.

The image processing unit 140 identifies the road mark 30a, the road boundary 30b which are located at a distance of 10 meters from the vehicle 20 and thus have clear images in the image FRAME 5, and generates images of these objects at positions corresponding to the distance of 10 meters in the object distribution view shown in FIG. 6.

When the image processing unit 140 has performed steps S502 to S504 for all of the images FRAME obtained in one focus-sweep, an object distribution view is obtained which indicates a distribution of relative positions of the objects in front of the vehicle 20. An example of such a view is shown in FIG. 6. FIG. 6 displays all objects in a range from 10 meters to 50 meters ahead of the vehicle 20 and shot by the camera unit 120.

In step S505, when it is determined that processing of all the images FRAME obtained in one focus-sweep operation has been completed, the routine returns to step S501, and the camera unit 120 continues the focus-sweep operation from the latest focusing distance (it is 10 meters in the above example), for example, the camera unit 120 continues the focus-sweep operation with the focusing distance varying from 10 meters to 50 meters, and obtains plural images FRAME, and the image processing unit 140 produces a new object distribution view to update the previous one.

In the present embodiment, the display 200 displays the object distribution view, and a driver of the vehicle 20 can find obstacles such as buildings, trees, other vehicles, bicycles, passengers, and others ahead, thus effectively preventing collision accidents. In addition, the driver of the vehicle 20 is able to find such as the road mark, the road boundary, and this helps the driver to easily drive the vehicle 20 along the road marks.

In addition, the collision determination unit 300 can determine whether the vehicle 20 is to collide with other obstacles according to the object distribution view.

When the distance between the vehicle 20 and an obstacle ahead is less than a given safe distance, the collision determination unit 300 determines that it is in danger of collision, and the display 200 displays the obstacle in a noticeable color, such as red, to warn the driver of the vehicle 20 that collision with the obstacle may occur. In addition, the speaker 210 may sound a warning alarm to warn the driver of the risk of collision, or the vibrator 220 may vibrate to notify the driver.

In addition, since the object distribution view generated by the image processing unit 140 includes not only obstacles such as buildings, vehicles, trees, bicycles, passengers, but also road marks and road boundaries, the collision determination unit 300 also determines whether the vehicle 20 is to collide with the road mark or the road boundaries. When the collision determination unit 300 determines that the vehicle 20 is to collide with the road mark or the road boundaries, it implies that the vehicle 20 is moving away from the current lane, thus, the collision determination unit 300 may notify the driver of the vehicle 20 to drive along the current lane through the display 200, the speaker 210, or the vibrator 220. This helps avoid any risk, such as departure from the lane on highway because of fatigue of the driver, and greatly improves safety of driving the vehicle 20.

In the present embodiment, the anti-collision device 10 further includes a speed sensor 150 for detecting the speed of the vehicle 20. Based on the speed of vehicle 20 detected by the speed detector 150, the collision can calculate a safety distance in real-time, and by using the safety distance data, it is possible to effectively prevent collision.

In the anti-collision device 10, speed data and the corresponding data of safety distances can be stored in the Read Only Memory (ROM) 230 or other memories. The collision determination unit 300 may also use a pre-determined formula to calculate the safety distance according to the speed of the vehicle 20 given by the speed detector 150 anytime as needed.

In addition, in the anti-collision device 10 of the present embodiment, when the collision determination unit 300 determines that the collision may occur, the controller 100 controls to brake or accelerate, or change the direction of the vehicle 20 through the vehicle control unit 400.

In addition, when the collision determination 300 determines that the vehicle 20 is to collide with an object ahead by using the object distribution view given by the image processing unit 140, the vehicle control unit 400 may control to brake the vehicle 20 in advance, so as to keep a safe distance between the vehicle 20 and the object ahead.

When the vehicle 20 is about to depart from the lane, the vehicle control unit 400 may also control the handle of the vehicle 20 in advance, so as to keep the vehicle 20 in the right lane. When the driver of the vehicle 20 changes the lane intentionally, the driver can slightly resists the operations caused by the vehicle control unit 400, operations caused by the vehicle control unit 400 are released, and thus resuming control of the vehicle 20 by the driver.

In the present embodiment, preferably, the camera unit 120 picks up images at a high speed. This reduces exposure time required for capturing each of the image FRAME, thus it is possible to prevent the image FRAME from being vague when the vehicle 20 moves at a high speed and vibrates, and enables the image processing unit 140 to identify objects accurately. Further, because the camera unit 120 picks up images at a high speed, it is possible to identify objects accurately in a long distance range ahead of the vehicle 20, and update the position distribution view quickly, thus improve the real-time performance of the position distribution view.

In the above embodiment, for sake of simplicity, it is assumed that five images FRAME 1-FRAME 5 are obtained in one focus-sweep operation, and the longest focusing distance is 50 meters, the shortest focusing distance is 10 meters. However, in order to obtain images of all objects ahead of the vehicle 20, smaller the step of decreasing or increasing the focusing distances of the camera unit 120, higher the precision in the object distribution view, that is, it is possible to display smaller objects and two neighboring objects. But this increases the load of processing the images FRAME by the image processing unit 140. Depending on the purpose, persons skilled in the art may choose a proper step of the focusing distances to not only meet the requirements of detection accuracy, but also reduce the load of the image processing unit 140. Preferably, the step of changing the focusing distances is less than two meters. More preferably, the step is less than one meters.

The longest focusing distance and the shortest focusing distance may differ from 50 meters and 10 meters, respectively. In order to improve safety of driving the vehicle 20, it is preferable that the longest focusing distance be greater than or equal to 50 meters, and the shortest focusing distance be less than or equal to 5 meters.

In the present embodiment, each time the camera unit 120 performs focus-sweep, the image processing unit 140 updates the previous object distribution view. To improve the real-time performance of the anti-collision device 10, it is preferable that the camera unit 120 perform one focus-sweep operation per second to update the object distribution view frequently. Further, when the vehicle 20 moves at a high speed, in order to improve the real-time performance of the anti-collision device 10, it is preferable that the camera unit 120 performs five focus-sweep operations per second to update the object distribution view more frequently. For this purpose, it is preferable that the camera unit 120 picks up images at a speed greater than or equal to 500 frames per second. Therefore, it is possible to identify objects in a long distance range, for example, from 1 meter to 100 meters, ahead of the vehicle 20, and update the view five times per second. This enlarges the distance range in which objects are identifies, improves the accuracy of object identification, and improve the real-time performance.

In the above embodiment, it is described that one camera unit 120 is provided at the front end of the vehicle 20, but the present invention is not limited to this. For example, a camera may also be provided at the rear end of the vehicle 20, thus, the driver of the vehicle 20 is able to know the situation behind the vehicle 20, especially, driving conditions of other vehicles behind. When the distance between the vehicle 20 and a vehicle behind is less than a safety distance, the anti-collision device 10 is able to notify the driver of the vehicle 20 by the display 200, the speaker 320, or the vibrator 330, so that the driver takes necessary measures in time to avoid collisions with the vehicle behind. In this situation, the controller 100 of the anti-collision device 10 may direct the vehicle controller 400 to control to accelerate the vehicle 20 appropriately to avoid collisions with the vehicle behind.

In addition, a number of cameras may be provided on the side and at the rear end of the vehicle 20 to facilitate identification of objects in the lateral direction and/or behind the vehicle 20. Therefore, when the vehicle 20 is parking on a side of a road or in a garage, the driver of the vehicle 20 knows well a boundary of the road, a wall, or other obstacles, and the positions of parking lines, and this helps to avoid collisions. In addition, the controller 100 of the anti-collision device 10 may control the vehicle controller 400 to direct to move forward, backward, turn, or brake, thus the driver can automatically park without any operations by himself.

As described above, with a number of cameras being provided on the vehicle 20 to capture images in different directions, the image processing unit 140 is able to produce an object distribution view in a large area around the vehicle 20, and this improves convenience.

In addition, the image processing unit 140 may add grid lines to the object distribution view to indicate distance intervals. Thus, the driver of the vehicle 20 can confirm the distance between the vehicle 20 and other objects on the display 200, and this ensures safety of driving.

In the above embodiments, it is described that the camera unit 120 includes a CCD sensor, but the present invention is not limited to this. For example, the camera unit 120 may include CMOS sensors, or other photoelectric sensors. When it is not necessary to display objects in the object distribution view in color, the camera unit 120 may use monochromatic sensors. This greatly reduces cost of the camera unit 120, and increases processing speed of the image processing unit 140.

In addition, considering application in the night, an infrared sensor can be used in the camera unit 120, therefore, even in the night, it is possible to capture images of objects around the vehicle 20, identify objects with clear images formed in the images, and produce the object distribution view of objects ahead of the vehicle 20, thus improving usefulness of the anti-collision device 10.

In the above embodiment, it is described that the image processing unit 140 produces a plain view showing the distribution of objects ahead of the vehicle 20, but the present invention is not limited to this. For example, the image processing unit 140 may produce a three dimensional object distribution view to show the objects ahead of the vehicle 20.

Figure 7:
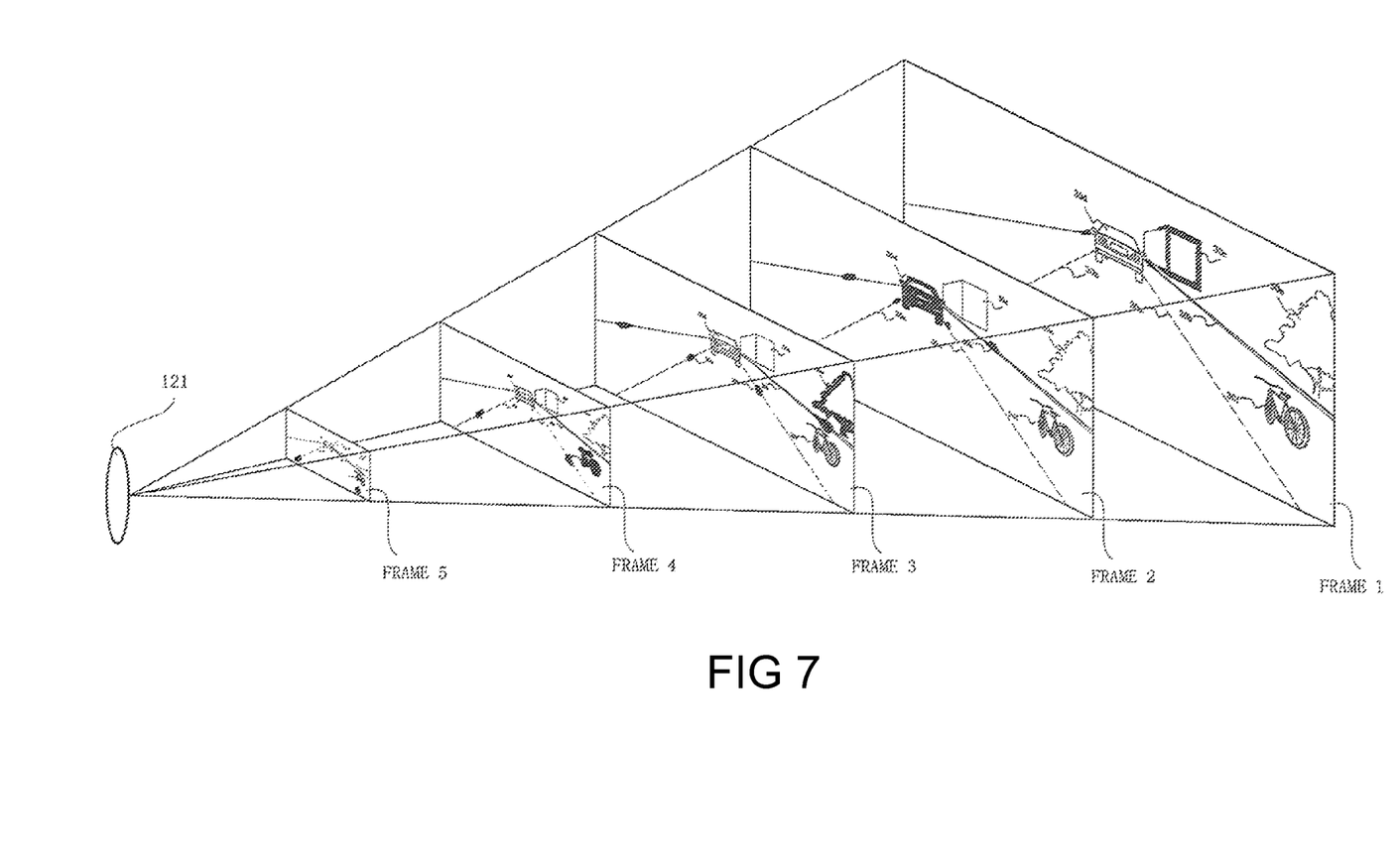
FIG. 7 illustrates a schematic view for explain the idea of producing a three dimensional object distribution view.

FIG. 7 illustrates a schematic view for explaining the idea of a three dimensional object distribution view.

In FIG. 7, the images FRAME 1 to FRAME 5 as shown in FIG. 4A to FIG. 4E are displayed in a three dimensional manner in which the images FRAME 1 to FRAME 5 are located at positions corresponding to their focusing distances, and have sizes corresponding to the shooting angle α.

In order to produce a three dimensional object distribution view, the same as step S503 in FIG. 5, the image processing unit 140 identifies the objects having clear images formed in the images FRAME 1 to FRAME 5.

In addition, the same as step S504 in FIG. 5, the image processing unit 140 calculates positions of the objects having clear images based on the focusing distances used when capturing the images FRAME 1 to FRAME 5, and generates an object distribution view indicating the position distribution of these identified objects. Specifically, the positions of the identified objects in the images FRAME 1 to FRAME 5 are determined by their angular positions when shooting the images FRAME 1 to FRAME 5. The image processing unit 140 generates three-dimensional images of those identified objects and locate them at positions corresponding to the focusing distances, and thus producing a three-dimensional view indicating a three-dimensional position distribution of objects at different distances ahead of the vehicle 20.

When the position distribution of objects is presented in a three dimensional manner on the display 200, the driver of the vehicle 20 is allowed to change the visual angle of the three-dimensional view, for example, the object position distribution can be presented as a bird's eye view, and this allows the driver to directly observe precise positions of objects in front of the vehicle 20. By changing the visual angle of observing the three-dimensional view, the position distribution of objects can also be presented as a plain view, as described in the previous embodiments.

In the above embodiment, it is described that the camera unit 120 has a fixed shooting angle α, thus has a fixed focal length. But the present invention is not limited to this. For example, the lens 121 may be a zooming lens, which has a variable focal length, thus has a variable shooting angle. When performing the focus-sweep, when the focusing distance is short, the focal length of the zooming lens can be shortened, thus the shooting angle of the zooming lens increases, and consequently, more objects in front of the vehicle 20 can be captured. On the other hand, when the focusing distance becomes long, the focal length of the zooming lens can become long, thus the shooting angle the zooming lens decreases, and consequently, objects at far distances can be accurately identified.

In the above embodiments, a vehicle is taken as an example of a moving body of the present invention, but the present invention is not limited to this. In the present invention, the moving body can be any movable device or any transportation equipment for production, and so on.

In the above embodiments, the image processing device of the present invention is applied to a vehicle or other moving bodies to work as a moving body anti-collision device, but the present invention is not limited to this. The image processing device of the present invention includes a camera unit 120 and an image processing unit 140, and is able to produce an object distribution view indicating a distribution of positions of objects shot by the camera unit 120. This object distribution view can be used in various situations, such as position identification and monitoring of apparatuses in factories, visual angle switching in sports broadcasting, interactive entertainment.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Chinese Priority Patent Applications No. 201110065887.9 filed on Mar. 18, 2011, the entire contents of which are hereby incorporated by reference.

What is claimed is:

1. A moving body anti-collision device provided on a moving body, comprising;
   a camera that picks up images around the moving body; and one or more processors that: process images provided by the camera, and determine collisions, wherein the camera includes:
   a lens,
   a motor that drives the lens to change a focusing distance of the camera,
   a sensor that picks up images, and
   wherein:
   the motor drives the lens to change the focusing distance of the camera at even intervals during a plurality of focus-sweep operations, so that clear images of a plurality of objects in front of the camera at different positions along an optical axis of the lens are sequentially formed on the sensor during each of the focus sweep operations,
   the sensor picks up a plurality of images corresponding to different focusing distances in each of the focus-sweep operations, the focusing distances of adjacent images sequentially picked up in each of the focus-sweep operations having a difference of less than or equal to one meter,
   the one or more processors receive the images obtained by the sensor of the camera in the focus-sweep operations, identify objects with clear images formed in the images of each of the focus-sweep operations, and produce a plurality of object distribution views indicating relative positions between the identified objects and the moving body, each of the identified objects being positioned within one or more of the object distribution views based on one or more focusing distances at which one or more clear images of the identified object are formed on the sensor during corresponding one or more of the focus-sweep operations, and the focus sweep operations being performed at least five times per second to obtain images for producing updated object distribution views, and
   the one or more processors determine whether the moving body is to collide with the identified objects according to the object distribution views.

2. The moving body anti-collision device as claimed in claim 1, further comprising:
   a display that displays the object distribution views,
   wherein the display displays one of the identified objects with a different color when the one or more processors determine the moving body is about to collide with the one of the identified objects.

3. The moving body anti-collision device as claimed in claim 1, further comprising:

at least one of a vibrator, a speaker, or a display, wherein one or more of the vibrator, the speaker, or the display provide notifications to an operator of the moving body, and wherein a warning message is provided as a notification to the operator when the one or more processors determine the moving body is about to collide with one of the identified objects.

4. A moving body anti-collision device provided on a moving body, comprising;

a camera that picks up images around the moving body;

one or more processors that process images provided by the camera; and a display, wherein the camera includes:

a lens, a motor that drives the lens to change a focusing distance of the camera, and a sensor that picks up images, and wherein:

the motor drives the lens to change the focusing distance of the camera unit at even intervals during a plurality of focus-sweep operations, so that clear images of a plurality of objects in front of the camera at different positions along an optical axis of the lens are sequentially formed on the sensor during each of the focus sweep operations, the sensor picks up a plurality of images corresponding to different focusing distances in each of the focus-sweep operations, the focusing distances of adjacent images sequentially picked up in each of the focus-sweep operations having a difference of less than or equal to one meter, the one or more processors receive the images obtained by the sensor of the camera in the focus-sweep operations, identify objects with clear images formed in the images of each of the focus-sweep operations, and produce a plurality of object distribution views indicating relative positions between the identified objects and the moving body, each of the identified objects being positioned within one or more of the object distribution views based on one or more focusing distances at which one or more clear images of the identified object are formed on the sensor during corresponding one or more of the focus-sweep operations, and the focus sweep operations being performed at least five times per second to obtain images for producing updated object distribution views, and the display displays the object distribution views.

5. The moving body anti-collision device as claimed in claim 4, wherein the object distribution views are three-dimension views.

6. The moving body anti-collision device as claimed in claim 1, wherein the lens includes a zooming lens having a variable focal length, and wherein:

when the focusing distance is greater than a first predetermined value, the focal length of the zooming lens is increased, and when the focusing distance is less than a second predetermined value, the focal length of the zooming lens is decreased.

* * * * *